(12) United States Patent
Boecker et al.

(10) Patent No.: US 12,528,241 B2
(45) Date of Patent: Jan. 20, 2026

(54) METHOD OF MANUFACTURING AN ARRANGEMENT FOR THE TRANSPORT OF MEDIA AND ARRANGEMENT

(71) Applicant: TI Automotive Technology Center GmbH, Rastatt (DE)

(72) Inventors: Albert Boecker, Ettlingen (DE); Matthias Winter, Rastatt (DE); Thorsten Schaefer, Steinfeld (DE); Florian Deibel, Sinzheim (DE); Artem Tuzin, Stutensee (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 366 days.

(21) Appl. No.: 17/704,897

(22) Filed: Mar. 25, 2022

(65) Prior Publication Data

US 2022/0314520 A1 Oct. 6, 2022

(30) Foreign Application Priority Data

Mar. 31, 2021 (EP) ..................... 21166247

(51) Int. Cl.
*B29C 49/20* (2006.01)
*B29C 49/48* (2006.01)
(Continued)

(52) U.S. Cl.
CPC .............. *B29C 49/20* (2013.01); *B29C 49/48* (2013.01); *B29C 2049/2034* (2013.01);
(Continued)

(58) Field of Classification Search
CPC ............ B29C 49/20; B29C 2049/2034; B29C 2049/2047; B29K 2105/20; B29L 2031/18
See application file for complete search history.

(56) References Cited

U.S. PATENT DOCUMENTS 6,110,412 A * 8/2000 Anderson ............... B29C 49/20
264/516
6,729,868 B1 5/2004 Vogel et al.
(Continued)

FOREIGN PATENT DOCUMENTS

AU 2140270 A 4/1972
CN 1304351 A 7/2001
(Continued)

OTHER PUBLICATIONS

Mechanical translation of Inui JP 09-123258A dated May 1997. (Year: 1997).*

(Continued)

*Primary Examiner* — Nahida Sultana
(74) *Attorney, Agent, or Firm* — DICKINSON WRIGHT PLLC

(57) ABSTRACT

A method for manufacturing an arrangement for the transport of media includes a base body formed as a blow-molded part and at least one functional element, in which a preform consisting of polymeric material and at least one functional element are provided and arranged in a blow mold, wherein the base body is formed from the preform, wherein the preform bears against the functional element during forming, wherein the blow mold has a first mold element and a second mold element, wherein the base body is formed from the preform between the first mold element and the second mold element, wherein the first mold element and the second mold element bear against the functional element in such a way that excess material produced from the preform in the area of the functional element during blow molding can be removed.

7 Claims, 2 Drawing Sheets

(51) Int. Cl.
  *B29K 105/20*  (2006.01)
  *B29L 31/18*  (2006.01)
(52) U.S. Cl.
  CPC .. *B29C 2049/2047* (2013.01); *B29K 2105/20* (2013.01); *B29L 2031/18* (2013.01)

(56) References Cited

U.S. PATENT DOCUMENTS

| | | |
|---|---|---|
| 8,851,525 B2 | 10/2014 | Jang |
| 9,868,246 B2 | 1/2018 | Jang |
| 10,456,953 B2 | 10/2019 | Gobel |
| 11,375,852 B2 | 7/2022 | Crawley |
| 12,235,051 B2 * | 2/2025 | Boecker ............... F28D 7/0033 |
| 2008/0265461 A1 * | 10/2008 | Freund ............. G06K 19/07758 |
| | | 264/272.15 |
| 2013/0049256 A1 | 2/2013 | Tani et al. |
| 2013/0146170 A1 | 6/2013 | Jang |
| 2014/0021658 A1 * | 1/2014 | Porter .................... B29C 49/08 |
| | | 425/525 |
| 2014/0252690 A1 | 9/2014 | Jang |
| 2017/0043507 A1 | 2/2017 | Gobel |
| 2019/0160940 A1 * | 5/2019 | Schmitz ................. B60K 15/04 |
| 2019/0261814 A1 | 8/2019 | Crawley |
| 2022/0330756 A1 | 10/2022 | Crawley |

FOREIGN PATENT DOCUMENTS

| | | | |
|---|---|---|---|
| CN | 103147888 A | 6/2013 | |
| CN | 208759981 U | 4/2019 | |
| CN | 110087518 A | 8/2019 | |
| DE | 102017223207 A1 | 6/2019 | |
| EP | 2141000 A2 * | 1/2010 | ....... B29C 49/04118 |
| EP | 3124305 A1 | 2/2017 | |
| GB | 1310396 A | 3/1973 | |
| JP | 60135229 A * | 7/1985 | ............. B29C 49/20 |
| JP | H07214655 A | 8/1995 | |
| JP | H09123258 A | 5/1997 | |
| JP | H10211647 A | 8/1998 | |
| JP | 2004034567 A | 2/2004 | |
| JP | 2009-023179 A | 2/2009 | |
| WO | 9964221 A1 | 12/1999 | |

OTHER PUBLICATIONS

Abstract of JP 60135229 A (Shimizu) dated Jul. 1985. (Year: 1985).*
German Search Report dated Sep. 3, 2021.

* cited by examiner

METHOD OF MANUFACTURING AN ARRANGEMENT FOR THE TRANSPORT OF MEDIA AND ARRANGEMENT

RELATED APPLICATIONS

The present disclosure is a national phase application of European Application 21166247.3, filed on Mar. 31, 2021, the entire contents of which is incorporated herein by reference.

FIELD

The disclosure relates to a method for manufacturing an arrangement for the transport of media, comprising a base body formed as a blow-molded part and at least one functional element.

BACKGROUND

Arrangements for the transport of media are needed, for example, in electromobility. Electric vehicle batteries, especially lithium-ion batteries, show an optimal performance only within a limited temperature spectrum. Depending on the ambient temperature, it may therefore be necessary to heat or cool the batteries. Therefore, the drive unit of an electric vehicle generally has a temperature control circuit with a pipe arrangement through which e.g., temperature control media can be fed to the cells of the battery in order to control their temperature within the desired temperature spectrum.

Furthermore, it may be necessary to temper, in particular to cool, components of the entire drive unit of electric vehicles. In addition to the batteries, this includes the power electronics and the electric motor. The charging electronics and the associated plug connections and cables can also be cooled by means of the temperature control unit. This is particularly relevant in the context of fast charging processes.

In addition to use in a drive unit, there is a further area of application in connection with other vehicle electronics, in particular sensors and on-board computers. If a vehicle is equipped for autonomous driving, powerful sensors and powerful computers are required, wherein the systems are redundantly present in most cases. Due to the fact that the installation space in a vehicle is limited, these systems also have specific requirements for a temperature control unit to control the temperature of these components.

Temperature control media are also used in air conditioning systems. Air conditioning systems, in particular mobile air conditioning systems, comprise a pipe arrangement which enables the transport of temperature control media between the individual units of the air conditioning system. In mobile air-conditioning systems, for example in air-conditioning systems for vehicle interiors, the pipe arrangement is a comparatively complex structure. In addition, further components of the arrangement, for example functional elements such as pumps, are to be integrated into the arrangement in a space-saving manner. The integration of functional elements into the arrangement also results in the advantage that the assembly effort of the arrangement is lower. However, it must be ensured, particularly during assembly of the arrangement, that the functional element is held on the arrangement in a loss-proof manner.

BRIEF SUMMARY

An object of the disclosure is to enable cost-effective manufacture with a base body that is formed as a blow-molded part along with a functional element integrated in the base body.

This object is achieved using the features of claim 1. The subclaims refer to advantageous embodiments.

In the method according to the disclosure for manufacturing an arrangement for the transport of media, comprising a base body formed as a blow-molded part and at least one functional element, a preform consisting of polymeric material and at least one functional element are provided and arranged in a blow mold, wherein the base body is formed from the preform, wherein the preform bears against the functional element during forming, wherein the blow mold has a first mold element and a second mold element, wherein the base body is formed from the preform between the first mold element and the second mold element, wherein the first mold element and the second mold element bear against the functional element in such a way that excess material produced from the preform in the area of the functional element during blow molding can be removed.

After completion of the blow molding process, the one-piece base body is preferably positively connected to the functional element in a captive manner. The preform from which the base body is made can be formed as a tube, which is arranged between the two mold elements for forming. In the process, the preform also comes to bear against the functional element, which is arranged in the blow mold.

It is particularly preferred in this context that a flow-conducting connection is formed between the base body and the functional element. Accordingly, at least one flow channel can be formed in the base body, which opens into a further flow channel introduced into the functional element. The transition between the base body and the functional element, or the intermediate region between the base body and the functional element, should be permanently sealed.

To manufacture the base body, the two mold elements of the blow mold bear against the functional element at least in sections. During forming of the base body from the preform, a defined transition needs to be created between the base body and the functional element. In the process according to the disclosure, the mold elements bear against the functional element during blow molding in such a way that excess material produced in the area of the functional element during blow molding can be removed. For this purpose, the first mold element and the second mold element preferably bear against each other and against the functional element in such a way that excess material is separated from the base body.

Preferably, after closing, the two mold elements press the preform in such a way that defined areas are created in the area of the functional element where the excess material separates from the base body. Excess material, also referred to as parison waste, is such material of the preform that is located outside the areas of the mold elements forming the base body after the mold elements are closed. If the two mold elements come into contact with each other and bear against each other, a seam is formed in the area of contact and any excess material produced there falls off after demolding or can at least be easily removed. However, if a functional element is to be formed directly onto the base body, the seam is interrupted, and the mold elements do not touch in these sections. The seam then runs along the functional element in sections. To ensure that any excess material produced there can also be easily removed, the two mold elements bear against the functional element during blow molding in such a way that the excess material is also separated from the base body in this area. The excess material then either falls off directly after demolding or can be removed by simple means, for example by tearing or cutting it off.

Preferably, the functional element is formed from polymeric material. The preferred materials are plastics such as thermoplastic polymers or thermoplastic elastomers. Here, the material of the functional element is selected such that the functional element is dimensionally stable during blow molding. Accordingly, the glass transition temperature of the plastic selected for the functional element is above the temperature required for blow molding the preform. Alternatively, the functional element can be made of metallic material, ceramic material, or glass.

The first mold element and the second mold element preferably bear against the functional element with elastic pretension during blow molding. In this case, the two mold elements bear closely against the functional element without introducing any permanent deformation into the functional element.

The first mold element and the second mold element can be equipped with press-off edges, which bear against the functional element in a linear manner and with elastic pretension during blow molding. This creates particularly well-defined areas, which make it especially easy to remove any excess areas that are created after blow molding. The press-off edges can be formed in the shape of ribs. Depending on the embodiment, the press-off edges may also form cutting edges that cause the base body to separate from the excess material.

An arrangement according to the disclosure is obtainable by a method as previously described. Preferably, the arrangement forms a distribution structure for temperature control media.

The functional element can be designed as a connecting piece and form a hose connection, or a pipe or tube connection, for example. The hose connection makes it easy to connect the arrangement to one or more hoses through which a medium can be fed into the main body. However, the functional element can also be formed as an adapter, valve, pump, sensor or as part of the aforementioned elements.

The arrangement is particularly suitable for use in vehicles, especially preferably in electric vehicles. Due to the manufacturing process according to the disclosure, the arrangement is compact and has integrated functional elements. This makes the arrangement suitable for use as a distribution structure for temperature control media in electric vehicles.

BRIEF DESCRIPTION OF THE DRAWINGS

Some embodiments of the arrangement according to the disclosure and of the method according to the disclosure will be explained in more detail below with reference to the figures. These show, each schematically.

DETAILED DESCRIPTION

Figure 1:
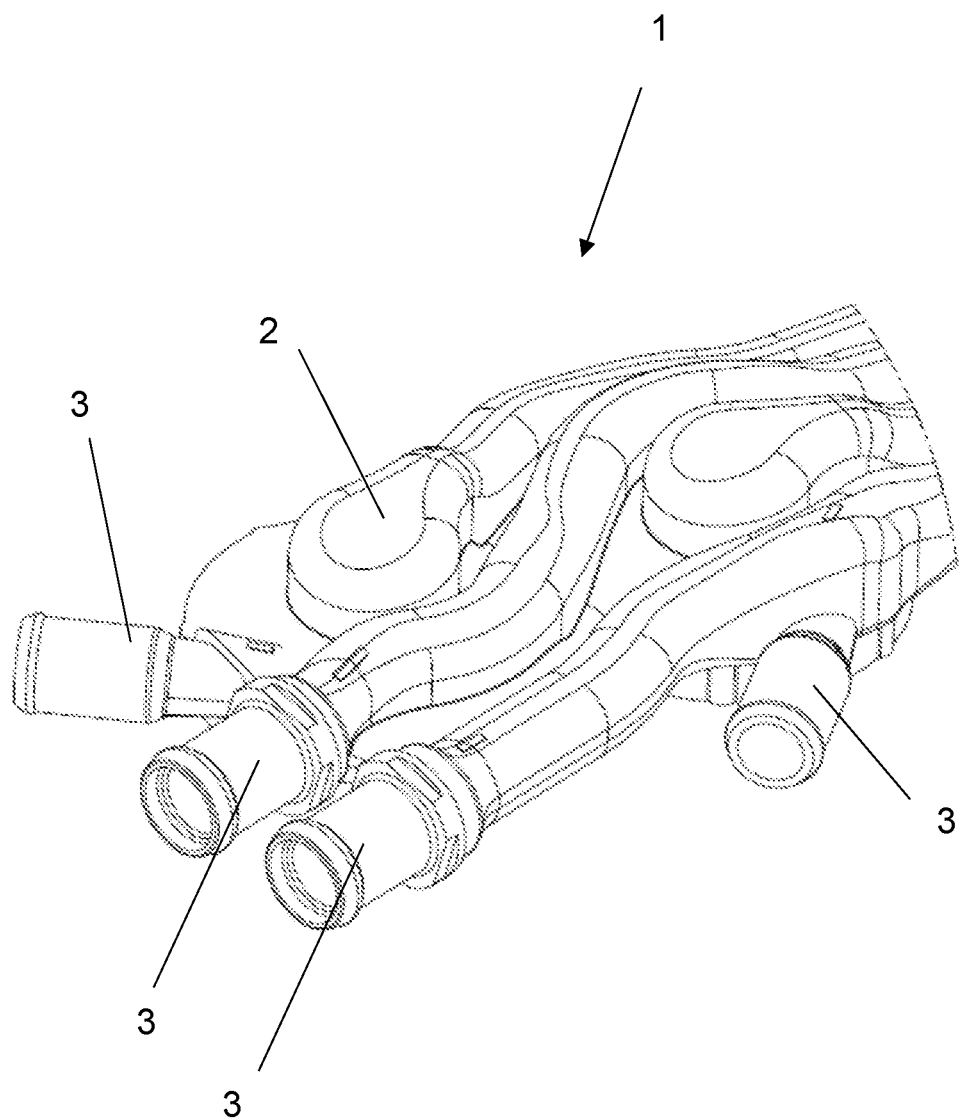
FIG. 1 an arrangement for the transport of media.

FIG. 1 shows an arrangement 1 for the transport of media. In the present case, the arrangement 1 forms a distribution structure for temperature control media, wherein the arrangement 1 is used in a temperature control circuit of an electric vehicle. Temperature control medium can be distributed via the arrangement 1 and fed to the equipment whose temperature needs to be controlled, for example the batteries, the electric motors, or the power electronics.

The arrangement 1 comprises a base body 2, which is formed as a blow-molded part, and a plurality of functional elements 3, which are connected to the base body 2 in a loss-proof manner. In this case, the functional elements 3 are designed as connecting pieces and are used to accommodate hoses for transporting the temperature control medium.

Like the functional elements 3, the base body 2 is made of polymeric material. The functional elements 3 are produced by injection molding, wherein the plastic for the functional elements 3 is selected such that its glass transition temperature is above the temperature required for forming the base body 2 by blow molding.

Since the functional elements 3 are already arranged in the blow mold 4 during the blow molding process, the base body 2 is molded directly onto the functional elements 3 in a positive and loss-proof manner. As a result, the arrangement 1 forms a unit that is easy to assemble.

Figure 2:
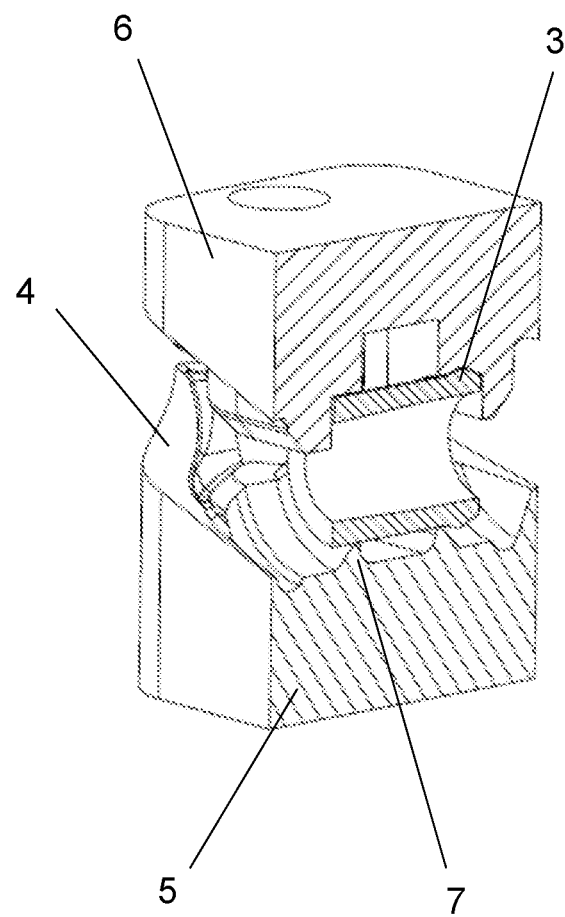
FIG. 2 a blow mold.

FIG. 2 shows a blow mold 4 for manufacturing the arrangement 1. The blow mold 4 comprises a first mold element 5 and a second mold element 6, wherein the base body 2 is formed from the preform between the first mold element 5 and the second mold element 6 during blow molding. In doing so, the preform is squeezed at the transition between the first mold element 5 and the second mold element 6, resulting in excess material along a seam, which is removed after the forming process.

In the area of the functional elements 3, the first mold element 5 and the second mold element 6 bear against the functional elements 3 in such a way that excess material produced in the area of the functional elements 3 during blow molding can be removed. In this case, the first mold element 5 and the second mold element 6 bear against the functional element 3 with elastic pretension during blow molding. The pretension is selected in such a way that no deformation which could result in a function restriction is introduced into the functional elements 3.

The first mold element 5 and the second mold element 6 are equipped with press-off edges 7 in the areas associated with the functional elements 3, which bear against the functional elements 3 in a linear manner and with elastic pretension during blow molding. This also forms a kind of seam in the area between the base body 2 and the functional elements 3, at which excess material can be removed particularly easily. Excess material can be cut off or torn off after blow molding. Preferably, excess material is torn off, which speeds up the manufacturing process. Depending on the embodiment, the press-off edges 7 can also form cutting edges which effect a defined separation of the base body 2 from the excess material.

The invention claimed is:

1. A method for manufacturing an arrangement for the transport of media, comprising a base body formed as a blow-molded part and at least one functional element, comprising:

Providing and arranging a preform consisting of polymeric material and at least one functional element in a blow mold;

Forming the base body from the preform, wherein the preform bears against the functional element during forming, wherein the blow mold has a first mold element and a second mold element, wherein the base body is formed from the preform between the first mold element and the second mold element, wherein the first mold element and the second mold element bear against the functional element in such a way that excess material produced from the preform in the area of the functional element during blow molding can be removed, and wherein the first mold element and the second mold element are configured to bear linearly against the functional element with elastic pretension during blow molding such that no deformation, including no partially plasticized or melted area by introduction of heat, is introduced into the functional element.

2. The method according to claim 1, wherein the first mold element and the second mold element bear against each other and against the functional element in such a way that the excess material can be removed from the base body.

3. The method according to claim 1, wherein the functional element is formed from polymeric material.

4. The method according to claim 1, wherein the first mold element and the second mold element are equipped with press-off edges which, during blow molding, bear linearly and with elastic pretension against the functional element.

5. The method according to claim 1, wherein the arrangement forms a distribution structure for temperature control media.

6. The method according to claim 1, wherein the functional element is formed as a connecting piece.

7. The method according to claim 6, wherein the connection piece forms a hose connection.

\* \* \* \* \*